United States Patent
D'Agosto, III et al.

(10) Patent No.: US 6,493,672 B2
(45) Date of Patent: Dec. 10, 2002

(54) AUTOMATIC DISTRIBUTION OF VOICE FILES

(75) Inventors: Nicholas A. D'Agosto, III, Trumbull, CT (US); Lynn Connellly, Milford, CT (US); John Sheffield, Milford, CT (US)

(73) Assignee: Dictaphone Corporation, Stratford, CT (US)

(*) Notice: Subject to any disclaimer, the term of this patent is extended or adjusted under 35 U.S.C. 154(b) by 0 days.

(21) Appl. No.: 10/000,587

(22) Filed: Oct. 19, 2001

(65) Prior Publication Data

US 2002/0038214 A1 Mar. 28, 2002

Related U.S. Application Data

(63) Continuation of application No. 09/320,345, filed on May 26, 1999, now abandoned.

(51) Int. Cl.$^7$ .......................... G11B 20/10; G10L 21/04
(52) U.S. Cl. ...................... 704/270.1; 704/503; 379/75; 369/25.01
(58) Field of Search ................. 704/231, 235, 704/251, 270, 270.1, 503, 504, 211; 369/25.01, 29.01; 379/75

(56) References Cited

U.S. PATENT DOCUMENTS

| | | | |
|---|---|---|---|
| 4,319,337 A | 3/1982 | Sander et al. | |
| 4,837,830 A | 6/1989 | Wrench, Jr. et al. | |
| 5,033,077 A | 7/1991 | Bergeron et al. | |
| 5,146,439 A | 9/1992 | Jachmann et al. | |
| 5,265,075 A | 11/1993 | Bergeron et al. | |
| 5,477,511 A | 12/1995 | Englehardt | |
| 5,481,645 A | 1/1996 | Bertino et al. | |
| 5,491,774 A | 2/1996 | Norris et al. | |
| 5,568,538 A | 10/1996 | Tamir et al. | |
| 5,774,841 A | 6/1998 | Salazar et al. | |
| 5,818,800 A | 10/1998 | Barker | |
| 5,839,108 A | 11/1998 | Daberko et al. | |
| 5,898,916 A | 4/1999 | Breslawsky | |
| 5,903,871 A | 5/1999 | Terui et al. | |
| 5,982,857 A | 11/1999 | Brady | |
| 5,986,568 A | 11/1999 | Suzuki et al. | |
| 6,038,199 A * | 3/2000 | Pawlowski et al. | 369/29.02 |
| 6,122,614 A | 9/2000 | Kahn et al. | |
| 6,282,154 B1 | 8/2001 | Webb | |
| 6,308,158 B1 * | 10/2001 | Kuhnen et al. | 704/235 |
| 6,321,129 B1 * | 11/2001 | D'Agosto, III | 360/137 |
| 6,356,754 B1 | 3/2002 | Onozawa et al. | |

OTHER PUBLICATIONS

TechEncyclopedia, Definition of "Download," TechWeb: The Business Technology Network, 2002, 2 Pages.*
Uploading—A Whatis Definition, TechTarget 2002, 2 Pages.*
Lisa J. Stifelman, "VoiceNotes: An Application for a Voice–Controlled Hand–Held Computer," MIT Master's Thesis (Jun., 1992).

* cited by examiner

Primary Examiner—Marsha D. Banks-Harold
Assistant Examiner—Martin Lerner
(74) Attorney, Agent, or Firm—Howrey Simon Arnold & White, LLP; Anthony L. Meola

(57) ABSTRACT

The proceedings of a business meeting are recorded on a portable digital audio recorder. The resulting digitized speech signals are uploaded to a personal computer which is part of a data communication network. Users of the network may arrange to access the uploaded digitized speech signals for downloading to the user's location. The downloaded digitized speech signals are audibly reproduced at the location of the requesting user.

20 Claims, 5 Drawing Sheets

AUTOMATIC DISTRIBUTION OF VOICE FILES

This application is a continuation application under 37 CFR §1.53(b) of prior application Ser. No. 09/320,345 filed on May 26, 1999 now abandoned.

FIELD OF THE INVENTION

This invention is concerned with recording and reproduction of audio signals for business and office applications.

BACKGROUND OF THE INVENTION

It is a common practice in connection with business meetings to assign to one person attending the meeting the responsibility for taking notes of the meeting and distributing the notes to all of the attendees and to other interested persons. The person responsible for preparing the minutes customarily takes handwritten notes during the meeting, has the notes transcribed, and causes the transcribed text of the notes to be distributed to appropriate recipients. Alternatively, the handwritten notes may be distributed without having been transcribed.

According to another known practice, a tape recorder such as a portable cassette recorder may be employed to tape-record the meeting. The tape cassette on which the meeting is recorded is then supplied to a transcriptionist, who transcribes the recorded proceedings. The transcribed text is then distributed.

The foregoing conventional techniques for documenting meetings have a number of disadvantages. Of course there are labor costs involved in the process of transcription. Furthermore, transcription usually entails a delay in making the meeting documentation available, and this delay is usually extended by the time required to deliver the documentation to the recipients. Even the process of distributing copies of handwritten meeting notes entails some delay and inconvenience.

OBJECTS AND SUMMARY OF THE INVENTION

It is an object of the invention to make proceedings of business meetings available for review by meeting participants and other interested persons in a manner that is rapid, convenient and inexpensive.

According to an aspect of the invention, there is provided a method of making and distributing voice recordings, including the steps of providing a portable digital audio recorder; using the portable digital audio recorder to record words spoken by a plurality of individuals at a meeting location, the spoken words being stored in the portable digital audio recorder in the form of digitized speech signals; and after the recording step, interfacing the portable digital audio recorder to a personal computer; uploading the digitized speech signals from the portable digital audio recorder to the personal computer; using a data communication network to distribute the uploaded digitized speech signals from the personal computer to a plurality of listener locations; and audibly reproducing the distributed digitized speech signals at the listener locations. The uploaded digitized speech signals may be transferred directly from the personal computer to the listener locations, or may be forwarded to a network server, from which the digitized speech signals are electronically distributed to the listener locations. Alternatively, the uploaded digitized speech signals are made available for retrieval via the network from the personal computer or the server.

According to another aspect of the invention, there is provided an apparatus for making and distributing voice recordings, including a portable digital audio recorder for recording, in the form of digitized speech signals, words spoken by a plurality of individuals at a meeting location, a plurality of personal computers including a first personal computer, an arrangement for interfacing the portable digital audio recorder to the first personal computer, a data communications network which interconnects the plurality of personal computers, first control circuitry programmed to upload the digitized speech signals from the portable digital audio recorder to the first personal computer via the interfacing arrangement, and second control circuitry programmed to receive from ones of the personal computers requests for access to the uploaded digitized speech signals, and to respond to the requests for access by distributing to the ones of the personal computers the uploaded digitized speech signals, with the apparatus further including speakers or other devices associated with the ones of the personal computers for audibly reproducing the distributed digitized speech signals.

The portable recorder may use a removable solid state data memory card as a recording medium. If so, the recording medium may by removed from the recorder and interfaced with the first personal computer for uploading the digitized speech signals to the first personal computer without interfacing the recorder itself to the first personal computer.

The present invention thus calls for distributing the proceedings of business meetings over a computer network and in the form of digitized speech signals. The invention thereby avoids the delays and costs entailed by transcribing meeting notes or recorded proceedings, as well as the inconvenience of distributing the resulting text in hard copy form.

Other objects, features and advantages of the invention will become apparent from the subsequent more detailed description of preferred embodiments.

DESCRIPTION OF PREFERRED EMBODIMENTS

Figure 1:
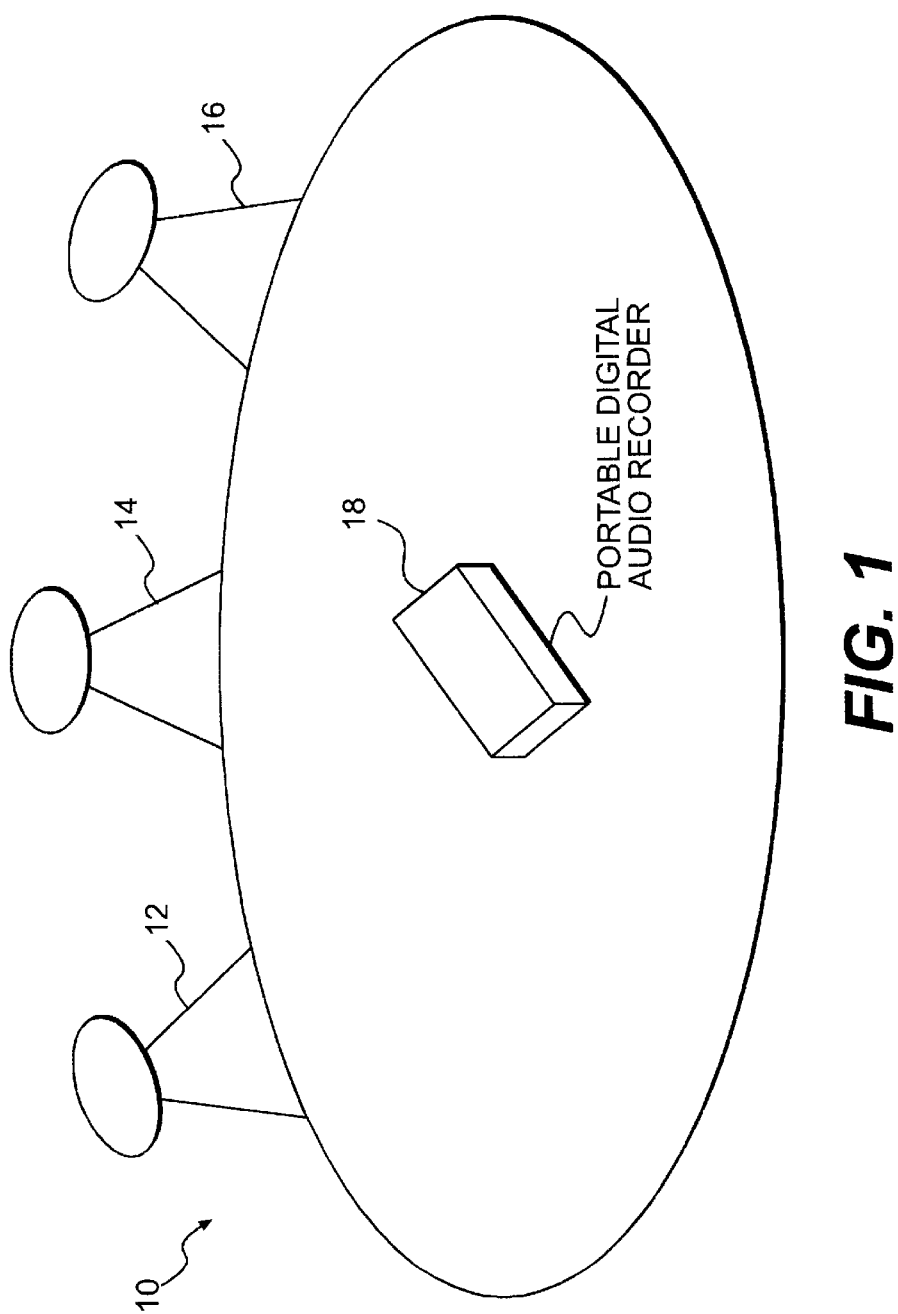
FIG. 1 schematically illustrates audio-recording the proceedings of a business meeting, in accordance with the invention.

Preferred embodiments of the invention will now be described, initially with reference to FIG. 1. FIG. 1 schematically illustrates a meeting location 10, at which individual meeting participants 12, 14, 16 are gathered. Words spoken by the meeting participants are recorded on a recording medium in the form of digitized speech signals by a portable digital audio recorder 18 which is present at the meeting location 10. The portable digital audio recorder 18 may, for example, be any one of the following recorders that are commercially available from Dictaphone Corporation (which is the assignee of the present application): the Walkabout Tour (TM) recorder, the Walkabout Quest (TM) recorder, the Walkabout Express (TM) recorder or the Walkabout Trek (TM) recorder. It is preferably the case (as in the recorder models listed above) that the recording medium be a removable solid state data memory card. A recorder which uses another type of recording medium such as a tape- or disk-shaped recording medium may also be used.

Although not shown in FIG. 1, it should be understood that an auxiliary microphone such as a noise-cancellation microphone, a directional microphone, or a conference microphone may be connected as an input device for the portable digital audio recorder 18 to enhance the quality of the recorded signal.

Figure 2:
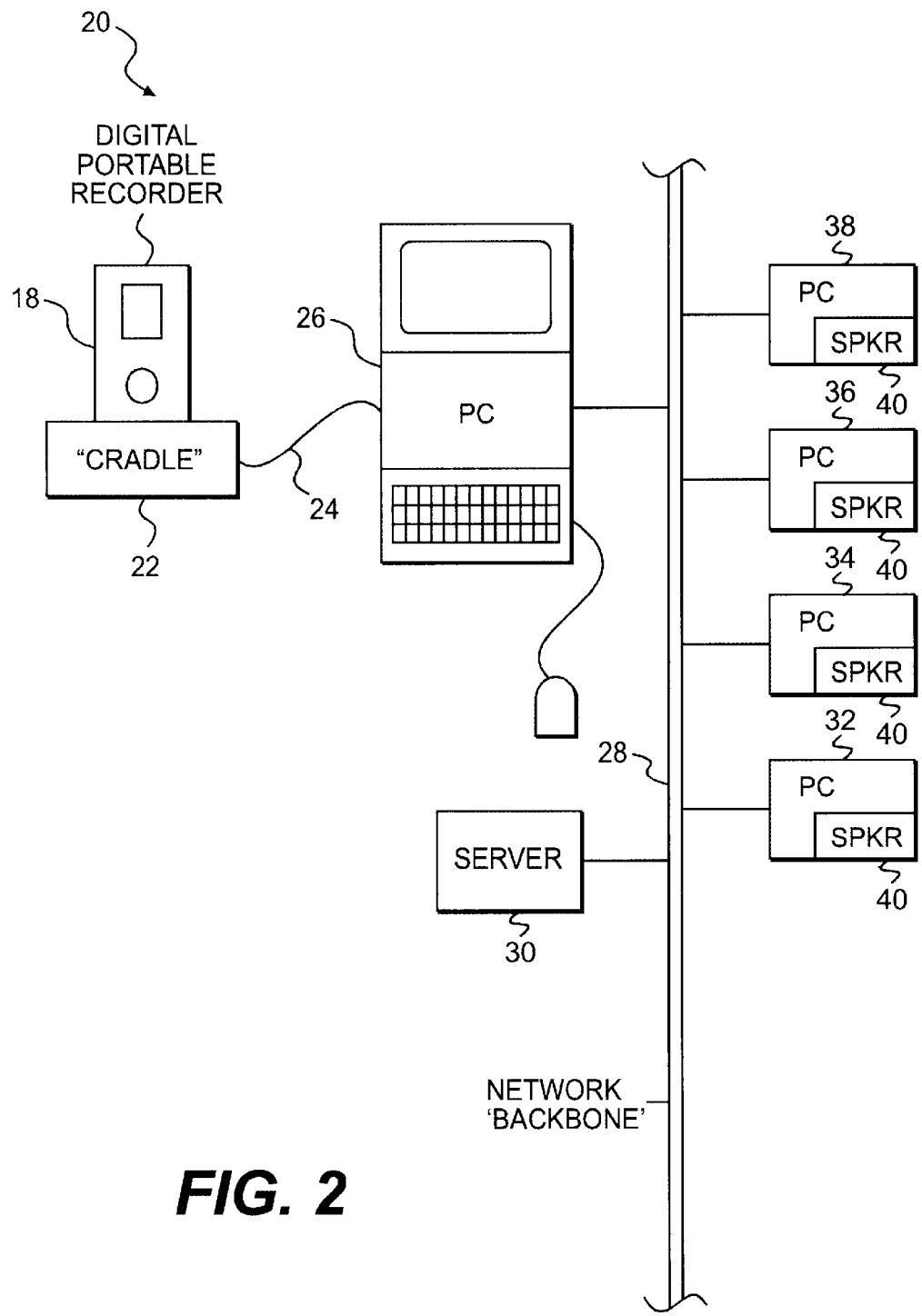
FIG. 2 is a schematic block diagram of a system provided in accordance with the invention for automatically distributing the audio-recorded proceedings of the business meeting illustrated in FIG. 1.

FIG. 2 illustrates in the form of a block diagram a system 20 which is provided in accordance with the invention for automatic distribution of the proceedings of the meeting which was recorded by the portable recorder 18. The voice signal distribution system 20 shown in FIG. 2 includes the above-mentioned portable recorder 18 and a docking station or cradle 22 in which the recorder 18 is positioned. The cradle 22 may be of the type commercially marketed by the assignee of the present application for use with the above-described examples of digital audio portable recorders. Preferably the cradle 22 includes a parallel-connector data port which mates with a corresponding data port provided on the bottom of the portable recorder 18. The cradle 22 and the portable recorder 18 may alternatively be arranged to provide a serial data communication link, such as that called for by the USB Standard.

The cradle 22 is connected via a wire connection 24 to a personal computer 26. The cradle 22 and the wire connection 24 form a signal path by which digital data may be exchanged between the portable recorder 18 and the PC 26.

The PC 26 is connected to a data communications network facility 28. Also connected to the network facility 28 are a system server 30 and additional personal computers 32, 34, 36 and 38. Although only four additional PC's are shown connected to the network facility 28, the number may be smaller, or, preferably, much larger. The network facility 28 may be implemented as a conventional LAN (local area network).

All of the hardware items making up the data communication network constituted by network facility 28, server 30, and PC's 26, 32, 34, 36 and 38 are preferably commercially available items. However, it is necessary that the PC's 32, 34, 36 and 38 include, or have associated therewith, at least one device such as a loud speaker 40 to permit sound signals to be audibly reproduced at the PC's 32, 34, 36 and 38. Commonly available PC's of the type referred to as "multimedia" personal computers would be suitable for use as the additional PC's.

Operation of the system of FIG. 2 will now be described. For the purposes of the following description, it will be assumed that the digital portable recorder 18 has been used to record the proceedings of a business meeting. In other words, it will be assumed that the portable digital audio recorder has been used to record the words spoken by a number of individuals participating in the business meeting, and that the resulting digital speech signals were stored in a solid state recording medium that was installed in the portable recorder 18 prior to and during the business meeting, and that the recording medium remains installed in the recorder 18.

Figure 3:
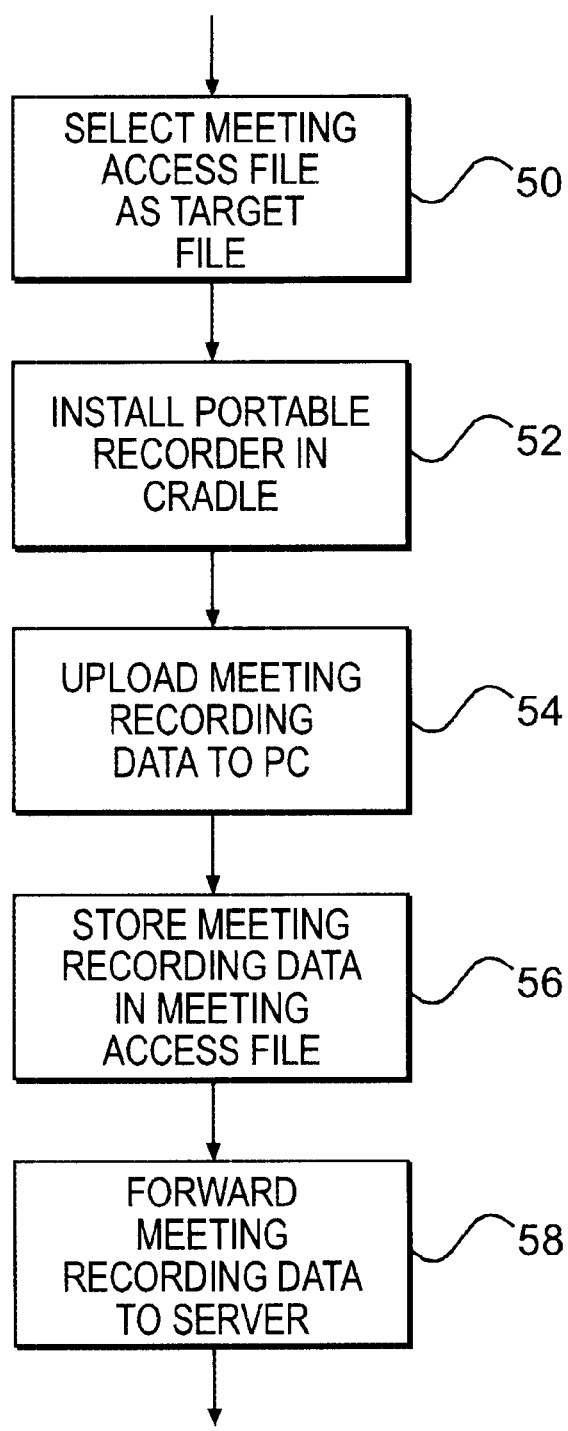
FIG. 3 illustrates in flow-chart form a process carried out in accordance with the invention for making the audio-recorded proceedings available for access via the system of FIG. 2.

FIG. 3 is a flow-chart which illustrates a process by which the digitized speech signals recorded in the recorder 18 are inputted into the system of FIG. 2 and made available for access by users of the system. According to an initial step of the procedure, represented by block 50 in FIG. 3, the individual responsible for disseminating the proceedings of the meeting operates the PC 26 so as to pre-select a particular data storage directory in the file management system of PC 26. The directory selected by the individual is one which has been designated as a directory for receiving voice information to be disseminated through the system 20. The step of selecting the directory is carried out in a manner such that the PC will operate to load into that directory voice information to be uploaded to the PC 26 via the cradle 22 and the wire connection 24. After selecting the appropriate directory at step 50, the individual then installs the portable recorder 18 in the cradle 22, as indicated by step 52 in FIG. 3. The cradle 22 and the PC 26 interact with each other so that the PC is notified that the recorder 18 is installed in the cradle 22. The PC 26 and/or the cradle 22 and/or the portable recorder 18 cooperate to carry out a routine which causes the digitized speech signals corresponding to the meeting to be uploaded from the recorder 18 to the PC 26 via the cradle 22 and the wire connection 24. This process is represented by step 54 in FIG. 3.

Alternatively, and according to a preferred manner of implementing the invention, the PC 26 is programmed so that whenever the recorder 18 is placed in the cradle 22, new voice data files in the portable are automatically uploaded to the PC and stored in association with the directory used for distributing the proceedings of meetings. It is also preferred that the PC automatically re-name any uploaded files as required to avoid duplicating the names of files that have previously been uploaded to the PC. In addition, the PC and/or the recorder are programmed so that no voice data file is uploaded twice to the same PC.

As indicated by the next step in FIG. 3, which is step 56, the PC 26 stores the uploaded digitized voice signals in the directory which was pre-selected by the individual user at step 50. Following step 56 is step 58, at which the PC 26 operates to automatically forward to the server 30 the digitized voice signals representing the meeting. It will be understood that the digitized voice signals are transmitted to the server 30 via the communications network facility 28.

Figure 4:
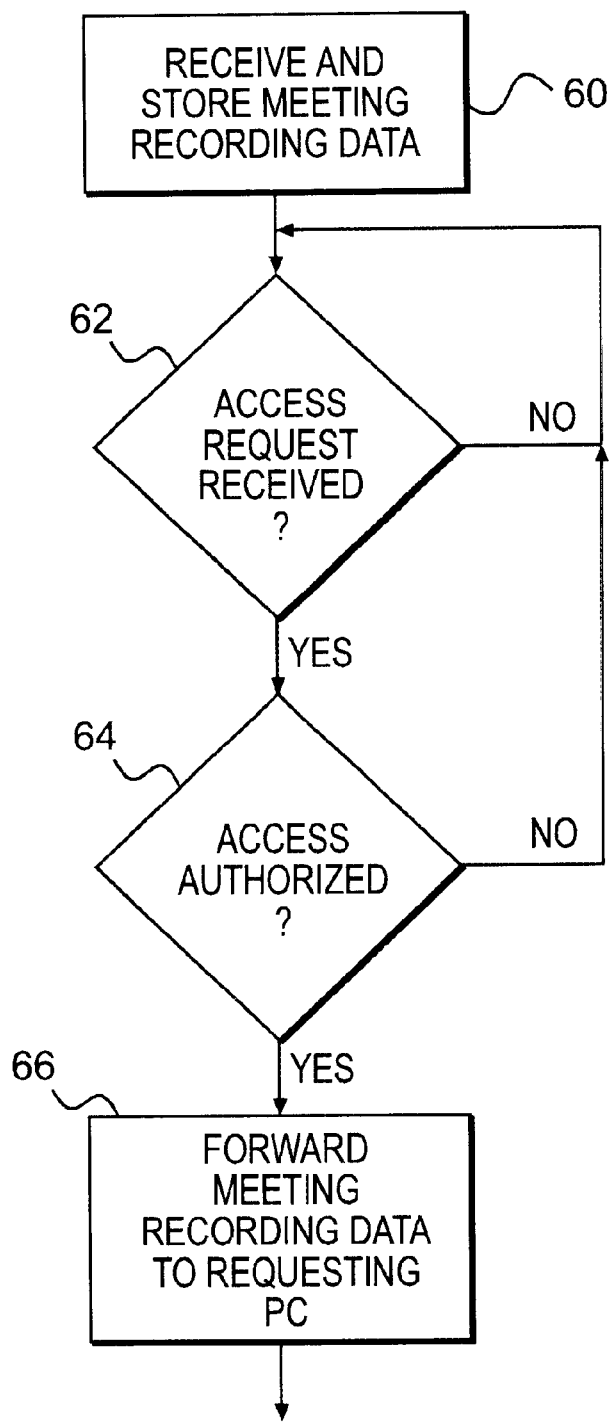
FIG. 4 illustrates a process whereby a system server component of the system of FIG. 2 handles a request for access to the audio-recorded proceedings.

FIG. 4 illustrates the procedure by which the server 30 receives and makes available for user access the digitized speech signals which represent the proceedings of the meeting.

Initially in FIG. 4 is step 60, in which the server 30 receives and stores the digitized speech signals transferred to the server 30 from the PC 26. After step 60 is step 62, at which it is determined whether a request to access the digitized speech signals is received. If so, step 64 follows, at which it is determined whether the request for access is from an authorized user. If so, then the digitized speech signals are sent to the authorized user (step 66). In this case it will be assumed that the authorized request for access was received from PC 38 (FIG. 2).

Figure 5:
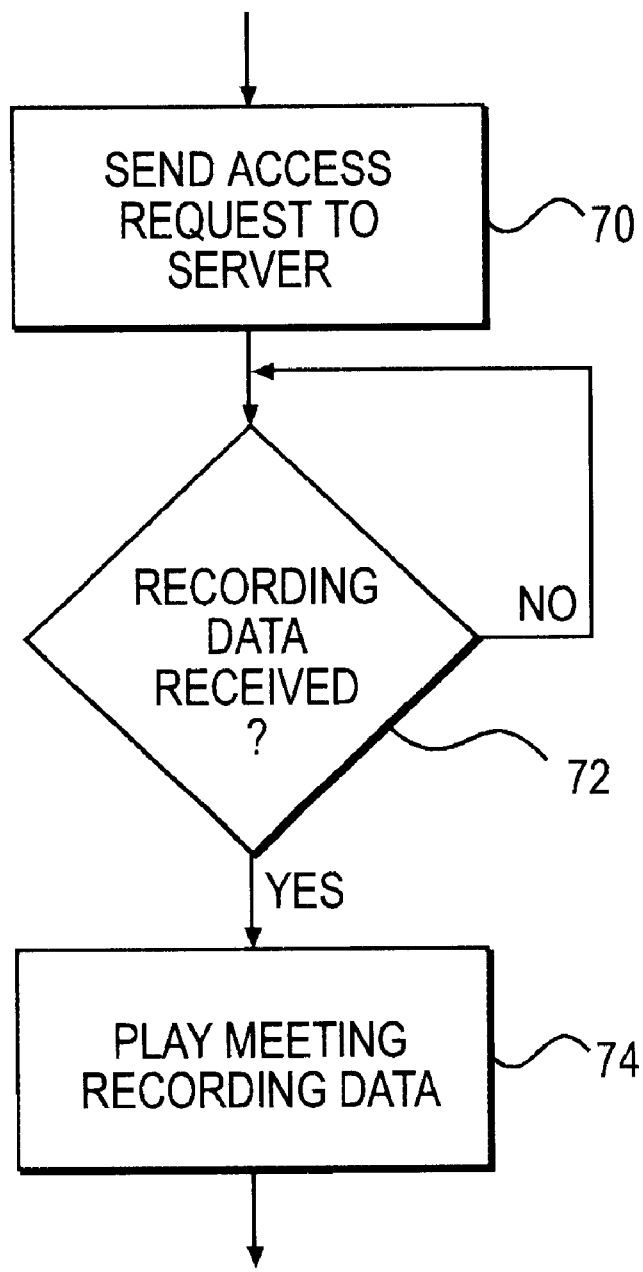
FIG. 5 illustrates in flow-chart form a process whereby an individual recipient obtains access to the audio-recorded proceedings.

FIG. 5 is a flowchart which illustrates the operation for obtaining access to the digitized speech signals from the point of view of processes carried out in the PC 38 operated by the user seeking access. The first step in FIG. 5 is step 70, at which the PC 38 sends an access request to the server 30.

Then, as indicated at step 72, the PC 38 idles or performs other functions until the requested digitized speech signals are received from the server 30. Then, the speech signals are audibly reproduced (step 74) via the speaker 40. It will be understood that the PC's 32–38 preferably include a conventional user interface by which audio playback control functions such as stop, rewind, fast-forward and play can be invoked by using a mouse or other pointing device to interact with a graphical user interface. In addition to these conventional control functions supported by the PC's 32–38, a "fast-play" function may be included, whereby the time-scale of the speech signals to be reproduced is compressed before playback occurs. Preferably a time-scale compression technique like that described in U.S. Pat. No. 5,216,744 is used, so that the pitch of the reproduced sound is not adversely affected. This feature makes it possible to reduce the elapsed time required to audibly reproduce the proceedings of the meeting.

With the system as described above, the recorded proceedings of the meeting are made available to authorized users of the system almost immediately after the end of the meeting. It is not necessary to transcribe recorded speech or notes, nor to physically distribute hard copies of notes or transcribed text. Authorized users who are interested can download the signals which represent the proceedings of the meeting and play back the proceedings in audible form. Users who are not interested need not bother to retrieve the recorded information. This system eliminates the burdensome conventional practice of supplying hard copies of meeting notes to individuals who are not interested in receiving the notes.

It is contemplated that a number of modifications may be made in the processes illustrated in FIGS. 3, 4 and 5. For example, the digitized speech signals representing the recorded proceedings of the meeting may be stored and made available for access in the PC 26 rather than in the server 30. In this case, step 58 of FIG. 3 and step 60 of FIG. 4 may be omitted, and steps 62–66 carried out in the PC 26 rather than in the server 30. It will also be recognized that step 70 of FIG. 5 would in this case consist of sending a request for accessing the digitized speech signals to the PC 26 rather than to the server 30. Moreover, the server 30 could be omitted from the system 20 if the first PC 26 is used for storing the meeting proceedings and fulfilling requests for access.

According to an alternative manner of carrying out the invention, the digitized speech signals which represent the proceedings of the meeting may be downloaded to the PC's of authorized recipients without waiting for a request for the recipients. An e-mail system which is operated over the network 28 may be used for this purpose. The PC 26 may be programmed to create an e-mail message addressed to all of the authorized recipients whenever a file of digitized speech signals is uploaded to the designated file for disseminating the proceedings of meetings. The PC 26 then appends the uploaded file of digitized speech signals to the e-mail message and broadcasts the e-mail message to the authorized recipients via the network 28.

There are also a number of different ways in which the digitized speech signals recorded by the recorder 18 may be uploaded to the PC 26. For example, the digital portable recorder 18 may have a capability for wireless data communication, e.g., by using the IRDA standard, and the PC 26 may have connected thereto an interface device to permit the PC 26 to receive wireless data communications of that type. In that case, the uploading of the digitized speech signals to the PC 26 may be accomplished by the wireless communication facilities just described. It should also be understood that the wire connection 24 between the cradle 22 and the PC 26 may be replaced by a wireless data communication link.

As another alternative, the PC 26 may be connected to an interface device (not shown) which is arranged to receive and read the solid state memory recording medium which is used by the portable recorder 18. A suitable interface device is commercially available from the assignee of this application. According to this alternative procedure, the recording medium may be removed from the recorder 18 and installed in the interface device adapted to the recording medium, for uploading of the data from the recording medium to the PC 26.

It should also be noted that headsets with earphones may be provided in addition to, or as an alternative to, the speakers 40 shown as being associated with the PC's 32–38 in FIG. 2. The headsets may then be used to play back the downloaded digital speech signals in an audible but private manner. It is also contemplated that the PC's 32–38 may have additional cradles 22 attached thereto, so that the digitized speech signals downloaded to one of those PC's at the recipient's request may be further downloaded to another portable digital audio recorder (not shown). The recipient may then remove the recorder and carry it with him or her, so that he or she may review the proceedings of the meeting at another time and place. Alternatively, the digitized speech signals may be downloaded from the system to a removable recording medium, which may then be installed in the recorder to play back the downloaded speech signals.

It is to be understood that the above description may indicate to those skilled in the art additional ways in which the principles of this invention may be used without departing from the spirit of the invention. The particularly preferred methods and apparatus are thus intended in an illustrative and not limiting sense. The true spirit and scope of the invention are set forth in the following claims.

What is claimed is:

1. A method of making and distributing voice recordings, comprising the steps of:
    (a) providing a portable digital audio recorder;
    (b) using the portable digital audio recorder to record words spoken by a plurality of individuals at a meeting location, said spoken words being stored in the portable digital audio recorder in the form of digitized speech signals;
        (b1) providing a personal computer connected to a voice information distribution system;
        (b2) designating a directory in a file management system of the personal computer as a directory for receiving voice information to be distributed through the voice information distribution system;
    (c) transferring the digitized speech signals to the personal computer;
        (c1) storing the transferred digitized speech signals in association with the designated directory;
    (d) using a data communication network to distribute the transferred digitized speech signals from the personal computer to a plurality of listener locations; and
    (e) audibly reproducing the distributed digitized speech signals at the listener locations.

2. A method according to claim 1, wherein step (d) includes transferring the digitized speech signals from the personal computer to a network server via said data communication network.

3. A method according to claim 1, wherein step (e) includes compressing a time-scale of the digitized speech signals.

4. A method according to claim 1, wherein step (c) includes interfacing the portable digital audio recorder to the personal computer and uploading the digitized speech signals from the portable digital audio recorder to the personal computer.

5. A method according to claim 4, wherein said step of interfacing the portable digital audio recorder to the personal computer includes installing the portable digital audio recorder in a docking station which is connected to the personal computer.

6. A method according to claim 1, wherein the portable digital audio recorder includes a removable solid state recording medium in which the digitized speech signals are stored.

7. A method according to claim 1, wherein step (d) includes transmitting the uploaded digitized speech signals to personal computers at said listener locations.

8. Apparatus for making and distributing voice recordings, comprising:
- a portable digital audio recorder for recording, in the form of digitized speech signals, words spoken by a plurality of individuals at a meeting location;
- a plurality of personal computers including a first personal computer;
- means for interfacing said portable digital audio recorder to said first personal computer;
- a data communications network interconnecting said plurality of personal computers;
- first control means associated with said first personal computer and programmed to:
  - designate a directory in a file management system of the first personal computer as a directory for receiving voice information to be distributed among said plurality of personal computers;
  - upload said digitized speech signals from said portable digital audio recorder to said first personal computer via said means for interfacing; and
  - store the uploaded digitized speech signals in association with the designated directory; and
- second control means associated with said data communications network programmed to:
  - receive from ones of said personal computers requests for access to said uploaded digitized speech signals; and
  - respond to said requests for access by distributing to said ones of said personal computers said uploaded digitized speech signals;
- said apparatus further comprising means, associated with said ones of said personal computers, for audibly reproducing said distributed digitized speech signals.

9. Apparatus according to claim 8, wherein said second control means is constituted by a system server connected to said data communications network.

10. Apparatus according to claim 8, wherein said second control means is constituted by said first personal computer.

11. Apparatus according to claim 10, wherein said first control means is constituted by said first personal computer.

12. Apparatus according to claim 8, wherein said first control means is constituted by said first personal computer.

13. Apparatus according to claim 8, wherein said first control means is constituted by said portable digital audio recorder.

14. Apparatus according to claim 8, wherein said means for interfacing includes a docking station connected to said first personal computer.

15. Apparatus according to claim 8, wherein the portable digital audio recorder includes a removable solid state recording medium in which the digitized speech signals are stored.

16. A method of making and distributing voice recordings, comprising the steps of:
(a) providing a portable digital audio recorder which includes a solid state data recording medium;
(b) using the portable digital audio recorder to record words spoken by a plurality of individuals at a meeting location, said spoken words being stored in the solid state data recording medium in the form of digitized speech signals;
(b1) providing a personal computer connected to a voice information distribution system;
(b2) designating a directory in a file management system of the personal computer as a directory for receiving voice information to be distributed through the voice information distribution system;
(c) after step (b), establishing a data communication path between the solid state data recording medium and the personal computer;
(d) uploading the digitized speech signals from the solid state data recording medium to the personal computer;
(d1) storing the uploaded digitized speech signals in association with the designated directory;
(e) using a data communication network to distribute the uploaded digitized speech signals from the personal computer to a plurality of listener locations; and
(f) audibly reproducing the distributed digitized speech signals at the listener locations.

17. A method according to claim 16, wherein step (e) includes transferring the digitized speech signals from the personal computer to a network server via said data communication network.

18. A method according to claim 16, wherein step (f) includes compressing a time-scale of the digitized speech signals.

19. A method according to claim 16, wherein step (c) includes installing the portable digital audio recorder in a docking station which is connected to the personal computer.

20. A method according to claim 16, wherein step (e) includes transmitting the uploaded digitized speech signals to personal computers at said listener locations.

* * * * *